United States Patent
Zhu et al.

(10) Patent No.: US 12,327,142 B2
(45) Date of Patent: Jun. 10, 2025

(54) WEIGHTED AVAILING OF CLOUD RESOURCES

(71) Applicant: Oracle International Corporation, Redwood Shores, CA (US)

(72) Inventors: Shushuai Zhu, Nashua, NH (US); Bo Zou, Ottawa (CA)

(73) Assignee: Oracle International Corporation, Redwood Shores, CA (US)

( * ) Notice: Subject to any disclaimer, the term of this patent is extended or adjusted under 35 U.S.C. 154(b) by 583 days.

(21) Appl. No.: 17/691,519

(22) Filed: Mar. 10, 2022

(65) Prior Publication Data

US 2022/0382595 A1 Dec. 1, 2022

Related U.S. Application Data

(60) Provisional application No. 63/194,928, filed on May 28, 2021.

(51) Int. Cl.
*G06F 9/50* (2006.01)

(52) U.S. Cl.
CPC ............ *G06F 9/5038* (2013.01); *G06F 9/505* (2013.01); *G06F 9/5055* (2013.01)

(58) Field of Classification Search
CPC ...... G06F 9/5038; G06F 9/505; G06F 9/5055; G06F 9/5072; G06F 2209/5015
See application file for complete search history.

(56) References Cited

U.S. PATENT DOCUMENTS

| 6,775,231 B1 | 8/2004 | Baker et al. |
| 7,362,766 B2 | 4/2008 | Karlsson et al. |

(Continued)

FOREIGN PATENT DOCUMENTS

| CN | 111225050 | 6/2020 |
| WO | 2016206441 | 12/2016 |

OTHER PUBLICATIONS

How Spot Fleet Works, Amazon Elastic Compute Cloud, Available Online at https://docs.aws.amazon.com/AWSEC2/latest/UserGuide/how-spot-fleet-works.html#spot-instance-weighting, Accessed from Internet on Jul. 22, 2021, pp. 1-10.

(Continued)

*Primary Examiner* — Kenneth Tang
(74) *Attorney, Agent, or Firm* — MUGHAL GAUDRY & FRANKLIN PC

(57) ABSTRACT

A computer-implemented method may include availing a computer platform to a client system. The computer platform may host data and perform data processing. The computer platform may receive a data set from the client system. Computational resources may be determined for the client system, based at least in part on the size of the data set and a size of other data received from the client system, and a category assigned to the client system. A weight may be determined for the client system based on the category, indicating a degree to which resources may be preferentially allocated to process requests associated with the client system. The client system may request a data operation be performed using the data set. Allocation of one or more resources may be prioritized for the data operation, based on the weight. The prioritization may influence how quickly the data operation is performed.

14 Claims, 5 Drawing Sheets

(56) References Cited

U.S. PATENT DOCUMENTS

| | | | | |
|---|---|---|---|---|
| 8,762,534 B1* | 6/2014 | Hong | ............... | H04L 67/10 |
| | | | | 709/227 |
| 9,417,902 B1 | 8/2016 | Noonan | | |
| 2012/0221732 A1 | 8/2012 | Waldspurger | | |
| 2016/0112341 A1* | 4/2016 | Lui | ............... | H04L 41/147 |
| | | | | 709/226 |
| 2018/0332138 A1* | 11/2018 | Liu | ............... | H04L 41/5041 |
| 2019/0138934 A1* | 5/2019 | Prakash | ............ | G06V 10/95 |
| 2020/0267055 A1* | 8/2020 | Vibhor | ............... | H04L 41/20 |

OTHER PUBLICATIONS

Kadioglu, Core Group Placement: Allocation and Provisioning of Heterogeneous Resources, EURO Journal on Computational Optimization, Apr. 16, 2018, 22 pages.

Kumar et al., Resource Allocation for Heterogeneous Cloud Computing Using Weighted Fair-Share Queues, IEEE International Conference on Cloud Computing in Emerging Markets (CCEM), 2018, pp. 31-38.

Shue et al., Performance Isolation and Fairness for Multi-Tenant Cloud Storage, USENIX Association, Proceedings of the 10th USENIX Symposium on Operating Systems Design and Implementation (OSDI '12), Oct. 2012, pp. 349-362.

* cited by examiner

WEIGHTED AVAILING OF CLOUD RESOURCES

CROSS-REFERENCES TO RELATED APPLICATIONS

This application claims the benefit of U.S. Provisional Application Ser. No. 63/194,928, filed May 28, 2021; the disclosure of which is hereby incorporated by reference in its entirety for all purposes.

BACKGROUND

Computing systems typically have a finite set of resources at any given point in time. A given computing system may be used to support computational operations and/or data storage of multiple clients. Thus, a computing system frequently must determine how to allocate the resources across clients. Determining how to allocate resources is challenging, as different clients frequently use the computing system to perform different types of operations and/or uses, and there is frequently sizable variability across clients with respect to the amount of data that is being fed to the computing system.

Previous solutions include monitoring resources used by instances of computing systems (such as virtual machines) and assigning weights to client systems in order to maintain some performance level of the virtual machine. As the client system's usage grows, however, more resources would be required. Thus, the amount a client system may grow their usage is limited by the required performance level of the virtual machine.

Other solutions may assign a weight to a client system based on a performance metric of the client system. The weights may be adjusted to ensure the performance metric is met, as laid out in a service level agreement, for example. As a client system's usage grows, there may be a need to migrate some or all of the client system's usage to one or more resource nodes, spreading out the client system's resource usage across multiple nodes. While assigning weights in this manner may provide for some performance metrics being met, there is inherent inefficiency in having a client system's resources distributed over multiple nodes, especially when multiple client system's may require similar distribution.

Still other solutions may use a assign different weights to client systems for various nodes in a distributed computing system. Client systems may therefore be expected to frequently switch between nodes, leading to the same inefficiencies described above. Thus, it would be advantageous to determine a resource-allocation strategy that can dynamically respond to changing total usages and client-specific usages of a computing system, where a client system may remain on a given node even as the client system's usage grows.

SUMMARY

Certain aspects and features of the present disclosure relate to systems and methods of weighted availing of cloud resources. In a certain embodiment, a computer-implemented method may include availing a computer platform to a client system. The computer platform may host data from the client system and perform data processing. The computer platform may receive at least part of a data set from the client system. Computational resources may then be determined for the client system, based at least in part on the size of the data set and a size of other data received from the client system and being hosted by the computing platform. A category may then be assigned to the client system. The category may be determined by one or more characteristics, such as a customer status or a paid status. A weight may be determined for the client system based on the category. The weight may indicate a degree to which resources of one or more types may be preferentially allocated to process requests associated with the client system relative to the processing of requests associated with other weights. The data set may be stored at a data storage of the computing platform. A request from the client system may be detected, requesting that a data operation be performed using the data set. Allocation of one or more resources may then be prioritized for the data operation, based on the weight. The prioritization may influence how quickly the data operation is performed relative to data operations associated with client systems having different weights relative to the weight for the client system.

In some embodiments, the prioritization of allocation of the one or more resources includes balancing weights across a set of node sets in the computing platform using a technique to provide for potential growth of each core initially assigned to each node to grow in size. The technique may include shifting core groups from a first node to a second node, depending upon the capacity of the node and the weights of client systems assigned to the first and second nodes. The potential growth may accommodate a potential transition from a predicted storage extreme associated with a low weight to a higher predicted storage extreme associated with a high weight.

In some embodiments, determining the weight may include determining whether the data size is below a predefined threshold. The predetermined threshold may be different for different client systems. For example, one client system may have a threshold of 10 GB whereas another client system may have a threshold of 100 GB. If the size of the data set is below the threshold, the weight may be set to a low value. If the size of the data set is above the threshold, the weight may be set to a high value. The allocation of resources may then be biased towards operations associated core groups associated with a higher value.

In some embodiments, the size of the data set received by the computing platform from the client system may be dynamically-monitored. Updates to the weights associated with the client system may then be dynamically-determined based on the size of the data set. For example, if the size of the data set increases, the weight associated with the client system may be increased. Similarly, the allocation of one or more resources may then be dynamically-adapted based on the weight.

In some embodiments, a core group may be identified to receive the data set. To identify the core group, one or more existing core groups may be identified, where the one or more existing core groups are associated with the client system. The one or more existing core groups may also be determined to be at a predefined capacity. A new core group may then be generated for the client system, where the identified core group is the new core group. An updated data size may then be determined, where an existing data size associated with the client system is combined with the data set. A new weight may then be determined based upon the updated data size, and a new weight assigned to the new core group and the existing core groups. One or more resources may then be prioritized for a new data operation associated with the client system based on the new weight.

In some embodiments, a core group may be identified to receive the data set, where the core group is hosted at a node set of the computing platform. The quantity of total core groups hosted at the node set may be based on a maximum potential weight. To identify the core group, one or more existing core groups may be identified, where the one or more existing core groups are associated with the client system. The one or more existing core groups may also be determined to be at a predefined capacity. A new core group may then be generated for the client system, where the identified core group is the new core group. An updated data size may then be determined, where an existing data size associated with the client system is combined with the data set. A new weight may then be determined based upon the updated data size, and a new weight assigned to the new core group and the existing core groups. One or more resources may then be prioritized for a new data operation associated with the client system based on the new weight.

In another embodiment, a system is disclosed. The system may include one or more data processors and a non-transitory computer readable storage medium containing instructions. When executed on the one or more data processors, the instructions may cause the one or more data processors to avail a computer platform to a client system. The computer platform may host data from the client system and perform data processing. The computer platform may receive at least part of a data set from the client system. Computational resources may then be determined for the client system, based at least in part on the size of the data set and a size of other data received from the client system and being hosted by the computing platform. A category may then be assigned to the client system. The category may be determined by one or more characteristics, such as a customer status or a paid status. A weight may be determined for the client system based on the category. The weight may indicate a degree to which resources of one or more types may be preferentially allocated to process requests associated with the client system relative to the processing of requests associated with other weights. The data set may be stored at a data storage of the computing platform. A request from the client system may be detected, requesting that a data operation be performed using the data set. Allocation of one or more resources may then be prioritized for the data operation, based on the weight. The prioritization may influence how quickly the data operation is performed relative to data operations associated with client systems having different weights relative to the weight for the client system.

In some embodiments, determining the weight may include determining whether the data size is below a predefined threshold. The predetermined threshold may be different for different client systems. If the size of the data set is below the threshold, the weight may be set to a low value. If the size of the data set is above the threshold, the weight may be set to a high value. The allocation of resources may then be biased towards operations associated core groups associated with a higher value.

In some embodiments, the instructions may further cause the processors to dynamically monitor the size of the data set received by the computing platform from the client system. Updates to the weights associated with the client system may then be dynamically-determined based on the size of the data set. Similarly, the allocation of one or more resources may then be dynamically-adapted based on the weight.

In some embodiments, the instructions may further cause the processors to identify a core group to receive the data set, where the core group is hosted at a node set of the computing platform. The quantity of total core groups hosted at the node set may be based on a maximum potential weight. To identify the core group, one or more existing core groups may be identified, where the one or more existing core groups are associated with the client system. The one or more existing core groups may also be determined to be at a predefined capacity. A new core group may then be generated for the client system, where the identified core group is the new core group. An updated data size may then be determined, where an existing data size associated with the client system is combined with the data set. A new weight may then be determined based upon the updated data size, and a new weight assigned to the new core group and the existing core groups. One or more resources may then be prioritized for a new data operation associated with the client system based on the new weight.

In another embodiment, a computer-program product tangibly embodied in a non-transitory machine-readable storage medium is disclosed. The computer-program product may include instructions that cause one or more data processors to avail a computer platform to a client system. The computer platform may host data from the client system and perform data processing. The computer platform may receive at least part of a data set from the client system. Computational resources may then be determined for the client system, based at least in part on the size of the data set and a size of other data received from the client system and being hosted by the computing platform. A category may then be assigned to the client system. The category may be determined by one or more characteristics, such as a customer status or a paid status. A weight may be determined for the client system based on the category. The weight may indicate a degree to which resources of one or more types may be preferentially allocated to process requests associated with the client system relative to the processing of requests associated with other weights. The data set may be stored at a data storage of the computing platform. A request from the client system may be detected, requesting that a data operation be performed using the data set. Allocation of one or more resources may then be prioritized for the data operation, based on the weight. The prioritization may influence how quickly the data operation is performed relative to data operations associated with client systems having different weights relative to the weight for the client system.

In some embodiments, the computer-program product may further cause the data processors to determine whether the data size is below a predefined threshold. The predetermined threshold may be different for different client systems. If the size of the data set is below the threshold, the weight may be set to a low value. If the size of the data set is above the threshold, the weight may be set to a high value. The allocation of resources may then be biased towards operations associated core groups associated with a higher value.

In some embodiments, the computer-program product may further cause the data processors to dynamically monitor the size of the data set received by the computing platform from the client system. Updates to the weights associated with the client system may then be dynamically-determined based on the size of the data set. Similarly, the allocation of one or more resources may then be dynamically-adapted based on the weight.

In some embodiments, the computer-program product may further cause the data processors to identify a core group to receive the data set, where the core group is hosted at a node set of the computing platform. The quantity of total core groups hosted at the node set may be based on a maximum potential weight. To identify the core group, one or more existing core groups may be identified, where the one or more existing core groups are associated with the client system. The one or more existing core groups may also be determined to be at a predefined capacity. A new core group may then be generated for the client system, where the identified core group is the new core group. An updated data size may then be determined, where an existing data size associated with the client system is combined with the data set. A new weight may then be determined based upon the updated data size, and a new weight assigned to the new core group and the existing core groups. One or more resources may then be prioritized for a new data operation associated with the client system based on the new weight.

In some embodiments, the computer-program product may further cause the data processors to identify a core group to receive the data set. To identify the core group, one or more existing core groups may be identified, where the one or more existing core groups are associated with the client system. The one or more existing core groups may also be determined to be at a predefined capacity. A new core group may then be generated for the client system, where the identified core group is the new core group. An updated data size may then be determined, where an existing data size associated with the client system is combined with the data set. A new weight may then be determined based upon the updated data size, and a new weight assigned to the new core group and the existing core groups. One or more resources may then be prioritized for a new data operation associated with the client system based on the new weight.

In some embodiments, the computer-program product may further cause the data processors to prioritize of allocation of the one or more resources. The prioritization may include balancing weights across a set of node sets in the computing platform using a technique to provide for potential growth of each core initially assigned to each node to grow in size. The technique may include shifting core groups from a first node to a second node, depending upon the capacity of the node and the weights of client systems assigned to the first and second nodes. The potential growth may accommodate a potential transition from a predicted storage extreme associated with a low weight to a higher predicted storage extreme associated with a high weight.

BRIEF DESCRIPTION OF THE DRAWINGS

Illustrative embodiments of the present invention are described in detail below with reference to the following drawing figures.

DETAILED DESCRIPTION

Figure 1:
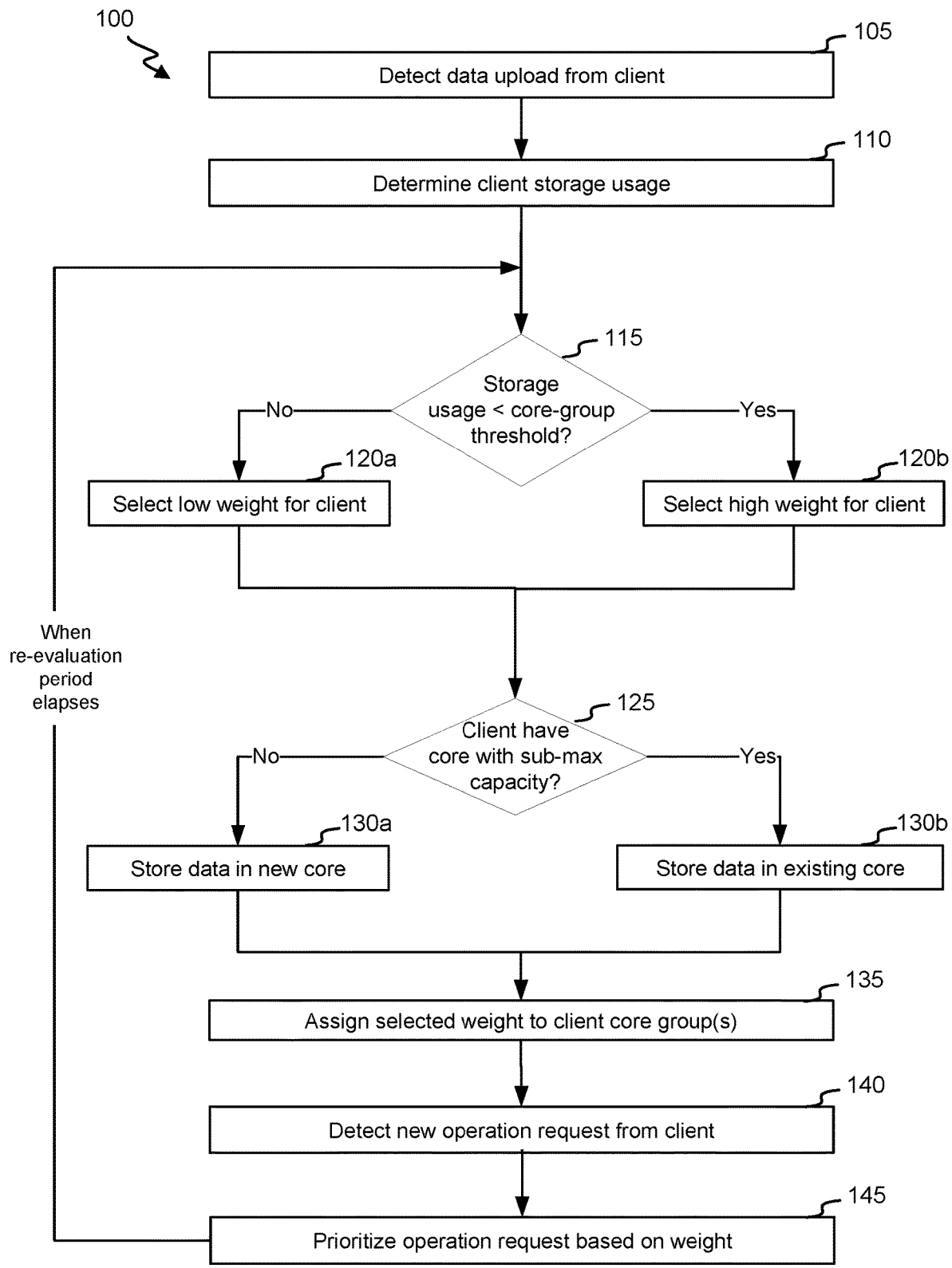
FIG. 1 shows a flow chart of an exemplary process for prioritizing resource allocations based on core-group weights in accordance with some embodiments.

In some embodiments, systems and methods are provided for allocating computational resources across clients by dynamically assigning weights based on client-specific usages of the computing system. More specifically, a rule set can indicate that larger weights are to be assigned for clients that have a larger size of client-associated log files on the system. Resources (e.g., CPU, memory, disk block volume, network bandwidth, etc.) are preferentially allocated to handle operations or storage for clients having higher weights. That is, weights are used to prioritize allocation of finite resources of the computing system across clients.

Some computing systems use a computing platform that allocates particular resources to individual clients and/or tasks. For example, an allocation may include assigning a rank to a given task, where a processing resource handles tasks in an order based on the tasks' ranks.

As used herein, a "core" refers a single logical index that potentially corresponds to a given client. As used herein, a "core group" refers to one or more cores associated with a given client (e.g., each core associated with a given client) and may potentially include a group coordinator to manage cores within the group. Each core includes files (e.g., configuration and schema files) associated with a client and potentially a transaction log. As used herein, a "node" refers to a computational resource, such as a Solr server. Each node can host multiple core groups (and thus multiple cores). Thus, a single server may be able to support multiple configurations and schema. As used herein, a "node set" refers to a set of servers that are managed as a unit.

As further described below, a weight may be assigned to each core group to facilitate allocating resources of a node. Further, a weight limit can be defined for each node set, and core groups can be assigned to a node set based on weights of core groups and the weight limit(s) of the node set(s).

Assigning Weights to Client System

A weight may be assigned to each client system or client based on a total storage usage of the client. In some instances, part or all of the storage usage relates to data that is being provided via a streaming service. Thus, the storage usage may dramatically vary across time.

The rule set may identify a relationship between the weight and storage usage, and the relationship may include (for example) a step function, a linear function, a sigmoidal function, etc. The relationship between the weight and storage usage may be defined based on a relationship between a cost of using the computing system and storage usage. For example, a rule set may indicate that a client is allowed to use the computing system for free (or for a default price) so long as its storage usage stays below a predefined threshold (e.g., 10 GB). The policy may indicate that a different cost is to be collected when a client's storage usage is not below the predefined threshold. The different cost may be a predefined amount (e.g., $100 per month) or determined using a formula (e.g., $10 per month times the number of gigabytes by which the storage usage exceeds the predefined threshold). The same predefined threshold may further be used in the relationship between the weight and storage usage. (e.g., to indicate that core groups associated with clients using less than 10 GB of storage are to be assigned a weight of 0.2, while clients using 10 GB of storage or more are to be assigned a weight of 1).

A category may be assigned to the client system. In some embodiments, the category based at least in part on the rule set (e.g., whether the client is a paying customer or not). In other embodiments, the category may include a business type, data type, or other such category. The category may be used at least in part to determine an assigned weight to core group(s) associated with the client system. The weight may be used to determine a threshold to which the client system is allowed to grow.

For example, a core group may be created and assigned a first weight (e.g., 0.2) if the client storage usage is less than a predetermined threshold (e.g., 10 GB). If the storage usage exceeds the predetermined threshold, a second weight may be assigned (e.g., a weight 1). A next core group may be created when the previous core group is full and is assigned the second weight. Upon its creation, the core group weight may be recorded and the aggregated weights of al core groups may be recorded and updated in related tables. If a core group is deleted or purged, the aggregated core group weights should be updated in the related tables. When the total weight of a node set reaches a max weight (e.g., the default max weight of a node set may be 10), the node set may not be a candidate to host a new core group. A timer may run at a predetermined interval (e.g., every 5 minutes) to convert core group weights from the first weight to the second weight if the corresponding client storage usage is greater than or equal to the predetermined threshold. Aggregated weights may similarly be updated. When a purge operation is performed, if the client storage usage is less than 10 GB, all core group weights may be converted from 1 to 0.2, and aggregated weights may be similarly updated.

It will be appreciated that a weight assigned to a core group (and thus resource prioritizations) can thus dynamically change. For example, at a first time point, a client may be storing a small amount of data (e.g., log files of a size below the predefined threshold) on the computing system. Thus, each core group of the client may be assigned a relatively low weight, and prioritizations of operations of each core group of the client may be lower than those of other clients associated with higher weights (e.g., which may lead to longer delays in performing operations and/or communicating with other devices). However, if the client later stores a large amount of data (e.g., of a size above the predefined threshold), the weight (and thus resource prioritizations) may be increased (e.g., instantaneously). In other words, weights may be assigned based at least in part on resources utilized by the client instead of resources used by the nodes.

Assigning Core Groups to Nodes Using Weights

Not only are the weights used to determine prioritizations for resource allocation of a node, but they are also used to assign core groups to individual nodes (or servers). Each node has finite resources, such as a particular CPU capacity, a particular memory size, and a particular size of block volumes. Performing operations for clients and core groups associated with low weights may require less resources and may be completed more quickly as compared to operations performed for clients and core groups associated with high weights. Thus, if a first node was assigned 100 core groups associated with low data storage and a second node was assigned 100 core groups associated with high data storage, delays in operation performance may be substantial for the second node while resources associated with the first node may be underutilized.

Accordingly, the computing system dynamically distributes core groups across multiple node sets based on weights of the core groups. More specifically, each node set can be associated with a node-set weight limit. Core groups can be assigned to a given node set until a given fraction of the node-set weight limit is reached, at which point each new core group can be assigned to a different node set. The fraction can be defined based on part or all of a range of weights that may be assigned to core groups. For example, if the weight assigned to core groups associated with a below-threshold storage usage is 0.2 and if the weight assigned to core groups associated with above-threshold storage usage is 1.0, the fraction may be defined to be $0.2/1.0=\frac{1}{5}$.

The fraction may be defined to account for the possibility that the data storage associated with existing clients may grow (e.g., based on variation of the size of data being streamed) and that switching clients from one node set to another results in multiple undesirable operational inefficiencies. These inefficiencies may be more undesirable when a client is a paying customer and/or has a large amount of data to transfer. Thus, core assignments may be performed in a manner that attempts to reduce circumstances where a cumulative data storage on a node set is or is about to exceed its maximum. Such approaches may include strategic initial assignments of cores to node sets and/to strategic reassignment of cores or core groups to node sets. The strategic initial assignments may include defining a node-set weight limit in view of clients' current data storages and potential different data storages.

As one illustrative example, it may be inferred that clients that are initially storing or processing a small amount of data on a computing system are relatively unlikely to substantially increase the size of data being stored or processed. This assumption may be more plausible when a fee structure results in a fee that positively depends on the data size being stored or processed. Meanwhile, it may be inferred that variation in data size is more likely in association with clients storing or processing more data. In either case, it will be appreciated that a storage of a node set may be initially, subsequently, or generally under-utilized based on the assignments of cores.

Thus, a predicted storage extreme may be defined for each client (or core group), where a potential extreme data storage correlates varies (and potentially varies non-linearly) with a client's current data size, and node set assignments may be identified using the predicted storage extreme. As one example, each client may be assigned a weight (e.g., based on a step-wise, linear, or nonlinear function that depends on initial data size), and a relationship may associate each weight with a particular predicted storage extreme. For each core associated with the client, the core may be assigned by determining which node set has sufficient available capacity to handle the predicted storage extreme. When the client has one or more cores assigned to an existing node set, the assignment may be biased towards the same node set. This determination may further depend on a current cumulative predicted storage extreme of the client and comparing a difference between the predicted storage extreme and a threshold of the node set to the predicted storage extreme. For example, a client may have a core group that is stored on a node set that happens to be within 1 predefined limit of the node set's capacity. In some instances, any new core group that is received may be assigned to a different node set. In some instances, a core group that is currently assigned to the node set (e.g., though that is associated with a low weight) may be reassigned to a different node set (e.g., in advance of or upon the computing system receiving more data to store and/or process).

Because loading data takes time, many—if not all—clients may be initially associated with a low data storage. Thus, assignments of core groups to node sets may be performed using an imposed limit of each node set's true storage maximum (a fraction of the true storage maximum) that is determined based on this potential data-storage growth.

It will be appreciated that a current data storage of a client varies in time and a weight of the client may also vary in time. Nonetheless, computing resources previously allocated to a client associated with a relatively high weight may be reserved for the client even if the weight has recently decreased. For example, a client may have been recently associated with an entire core group but may have since experienced a substantial decrease in the size of data being stored at and/or processed by a computing system. A rule, filter, or other processing technique may nonetheless at least temporarily reserve the previously allocated computing resources and/or a previously assigned weight for the client (e.g., given a potential of the client resuming the usage).

For example, a weight limit of a node set may be defined based on a potential storage of core groups assigned to the node set or a potential storage of clients associated with the node set. Alternatively or additionally, the potential storage of core groups or the potential storage of clients can influence assignments of core groups to node sets. The potential storage may be defined based on one or more weights, and the potential storage may be presumed to be a predicted storage extreme that may differ from a current storage. A predicted storage extreme may be defined for each weight (e.g., using a pair-wise association or predefined relationship). To illustrate, a predicted storage extreme may be defined to be 10 GB for each client associated with a total data storage of less than 10 GB, and a predicted storage extreme may be defined to be 100 GB for each other client.

This approach may assume that all core groups that are associated with low storage usage when they are added to a node set (e.g., as adding storage to a core group takes a finite amount of time) but that each of the core groups may later be associated with high storage usage. The fraction can then be defined to be sufficiently low such that the node set's weight limit is not exceeded even if all core groups assigned to the node set concurrently are associated with high storage usage.

In some embodiments, a first core group that is associated with low storage usage may later be associated with high storage usage, where the high storage usage exceeds the node set's weight limit. Other core groups associated with the node and associated with a client other that of the first core group may remain associated with low storage usage.

One or more of the other core groups may be transitioned to another node, enabling the first core group to remain on the node.

Advantages

Using a rule set to define prioritization weights to core groups based on storage usage has multiple advantages over alternative approaches that apply the same weight to each client or to each core group. For example, the computing system may be able to allocate resources such that handling of tasks (e.g., processing, storage and/or communication tasks) from clients that have reason to depend on the computing system are prioritized and completed promptly. Nonetheless, tasks that are associated with clients that are utilizing the computing system less are still handled in a reasonably prompt manner. These tasks may be less demanding of resources (e.g., due to less data being processed).

Further, the weight-based allocation of core groups across node sets facilitates efficient spinning up of new nodes. Reducing the number of nodes and node sets used in the computing system provides resource and financial savings. This is particularly beneficial as compared to alternative system designs where some resource may remain idle and/or under-utilized and/or some resources may be over-utilized so as to result in long processing delays.

Further yet, the rule set is configured to respond extremely quickly (e.g., instantaneously) to changes in data storage and usages of the computing system. This quick response is predicated on initial configuring and assigning core groups that are performed in view of the potential of large changes of resources across some or all clients.

Exemplary Process for Prioritizing Resource Allocations Based on Core-Group Weights FIG. 1 shows a flow chart of an exemplary process 100 for prioritizing resource allocations based on core-group weights in accordance with some embodiments. Process 100 begins at block 105 where a computing system (e.g., that provides a computing platform) detects that a client system has uploaded data to the computing system (or has requested initiation of the data upload). The client system may be associated with a new client that has not yet used the computing system or an existing client that has other data hosted by the computing system.

At block 110, the computing system determines the client storage usage. The client storage usage can be (for example) an instantaneous usage of storage of the computing system by a client associated with the client system. The client storage usage may identify a size of storage of the computing system that is consumed by files and/or data associated with and/or having been uploaded by the client system. The client storage usage may (for example) identify a size of each of one, more or all files uploaded by the client system; of one, more or all logs uploaded by the client systems; of one, more or all logs automatically retrieved based on instructions received from the client system; etc.

| CoreGroup Weight | Max Nodeset Weight | Max Core Groups per Nodeset | Max Logs per Core Group (MB) | Size per Core Group | Max Cores per Node | Max Logs per Core | Max Logs per Node |
|---|---|---|---|---|---|---|---|
| .01 | 10 | 1000 | 4 | 2 | 1000 | 1 | 1000 |
| .05 | 10 | 200 | 20 | 10 | 200 | 5 | 1000 |
| .1 | 10 | 100 | 40 | 20 | 100 | 10 | 1000 |
| .2 | 10 | 50 | 80 | 40 | 50 | 20 | 1000 |
| 1 | 10 | 10 | 400 | 200 | 10 | 100 | 1000 |

At block 115, it is determined (e.g., at the computing system) whether the storage usage is less than a predefined core group threshold. The core group threshold may be (for example) 1 GB, 2 GB, 5 GB, 10 GB, 25 GB, 50 GB, or 100 GB. If it is determined that the storage usage is below the predefined core group threshold, process 100 proceeds to block 120a, where a low weight is selected for the client. Meanwhile, if it is determined that the storage usage is not below the predefined core group threshold, process 100 proceeds to block 120b, where a high weight is selected for the client. In some instances, the low weight is a predefined fraction of the high weight (e.g., 1%, 5%, 10%, 20%, 30%, 50% or 75%).

Table 1

For example, Table 1 identifies 5 different potential weights associated with a client. As shown, lower client weights are associated with more cores being able to be stored in a node set. However, lower client weights are also associated with fewer logs being stored in a core group. Thus, a single node or a single node set can handle more core groups when the weight of each core group (and a corresponding size of each core group) is small. Meanwhile, when core groups are larger, a node or node set can handle fewer core groups. Thus, a weight that is assigned to a client may be selected by estimating (for example) what fraction of a node or node set would be devoted to handling the client's data that is stored at the computing system. It will be appreciated that, while FIG. 1 depicts a scenario of determining which of two client weights is to be used for the client, the process may instead select between more than two client weights or may calculate a client weight based on a function.

At block 125, it is determined whether a size of each core associated with the client is exceeds a predefined core capacity. A core capacity may depend on the assigned weight. For example, a core capacity may be inversely correlated with the weight. The core-group capacity may be lower than, the same as, or greater than the predefined core group threshold. In some instances, the determination is based on a size of the data uploaded at block 105.

If it is determined that the client is not associated with a core that does exceeds the predefined core-group capacity, process 100 continues to block 130a, where a new core is defined. The uploaded data is then stored in the new core. However, if it is determined that the client is associated with a core group that does exceed the predefined core capacity, process 100 continues to block 130b, where the uploaded data is stored in the new core.

At block 135, the weight that was selected at block 120a or 120b is assigned to each of core associated with the client and/or in a core group associated with the client. Thus, the selected weight is assigned to the existing core group to which the data was potentially stored at block 130b and potentially to the new core group at which the data was stored at block 130a. The selected weight can be assigned to any other core associated with the client.

At block 140, a request is received from the client system to perform a new operation. The new operation may involve (for example) processing stored data.

At block 145, the operation request is prioritized based on the weight assigned to the client. The prioritization may relate to how quickly one or more resources are allocated to process the request and/or an extent to which each of one or more resources are devoted to processing the request.

It will be appreciated that modifications to process 100 are contemplated. For example, as depicted, process 100 begins with a detection of a data upload. However, one, more or all of blocks 110, 115, 120a, 120b, 135, 140 and 145 may be performed following a detection of a data purge or other action associated with the client.

In the following examples, clients storing a small amount of data on a computing system (up to 10 GB) are assigned a weight of 0.2, while clients storing a larger amount of data (10 GB or more) are assigned a weight of 1.0. It is further assumed that the average size of a log entry is 500 bytes.

Example 1: Regular Client with Abundant Core Group Resources

A client requests access to a computing system over a time period. At the time of the request, the storage associated with the request is below a weight-transition threshold of 10 GB. In response to the request, a core group is generated that includes a maximum log count of 400,000,000. The core group is assigned to a particular node set.

Because the storage associated with the request is below the weight-transition threshold, the core group is assigned a low weight (of 0.2). Additionally, the client qualifies for a free account due to the storage being below the weight-transition threshold. The client continues to upload data. The total size of the data from the client that is being hosted by the computing system is regularly monitored.

It is detected that the total size of the data from the client that is being hosted by the computing system exceeds the weight-transition threshold of 10 GB (thus qualifying the client as being classified as a "regular client"). In response to the detection, the weight assigned to the core group is increased from 0.2 to 1.0.

The client continues to add data. It is detected that the log count in the data from the client that is being hosted by the computing system exceeds the maximum log count. In response to the detection that the maximum log count has been exceeded, a new core group is created. However, because weights are assigned on a client level (and then imposed on a core-group level), the weight of the new core group is 1.0

Example 2: Regular Client with Limited Core Group Resources

A client requests access to a computing system over a time period. At the time of the request, the storage associated with the request is below a weight-transition threshold of 10 GB. In response to the request, a core group is generated that includes a maximum log count of 400,000,000. The core group is assigned to a particular node set.

Because the storage associated with the request is below the weight-transition threshold, the core group is assigned a low weight (of 0.2). Additionally, the client qualifies for a free account due to the storage being below the weight-transition threshold. The client continues to upload data. The total size of the data from the client and from other clients that is being hosted by the computing system is regularly monitored.

In this instance, the node set has a weight limit of 50. It is determined that, in response to a recent data upload, a total weight assigned to the node set exceeds a specified fraction of the node set's weight limit (20% of 50=10).

A new client request is detected. A core group is generated in response to the new client request. Because the total weight assigned to the node set exceeds the specified fraction of the node set's weight limit, the core group is assigned to a different node set.

Example 3: Low-Usage Client

A client requests access to a computing system over a time period. At the time of the request, the storage associated with the request is below a weight-transition threshold of 10 GB. In response to the request, a core group is generated that includes a maximum log count of 400,000,000. The core group is assigned to a particular node set.

Because the storage associated with the request is below the weight-transition threshold, the core group is assigned a low weight (of 0.2). Additionally, the client qualifies for a free account due to the storage being below the weight-transition threshold. The client continues to upload (and occasionally delete) data. Because the total size of the data from the client consistently remains below the weight-transition threshold, the weight associated with the client and core group remains at the low weight.

Example 4: Low-Usage Client with Occasional Modestly Higher Usage

A client requests access to a computing system over a time period. At the time of the request, the storage associated with the request is below a weight-transition threshold of 10 GB. In response to the request, a core group is generated that includes a maximum log count of 400,000,000. The core group is assigned to a particular node set.

Because the storage associated with the request is below the weight-transition threshold, the core group is assigned a low weight (of 0.2). Additionally, the client qualifies for a free account due to the storage being below the weight-transition threshold. The client continues to upload (and occasionally delete) data.

It is subsequently detected that the total size of the data being hosted at the computing system from the client exceeds the weight-transition threshold. In response to the detection, the weight assigned to the core group is changed to a high weight (of 1.0) and prioritization for resource usage is accordingly raised for the client.

The client then purges data and the total size of the data being hosted at the computing system from the client drops below the weight-transition threshold. The weight assigned to the core group then reverts to the low weight (of 0.2) and prioritization for resource usage is accordingly lowered for the client.

Example 5: Low-Usage Client with Occasional Substantially Higher Usage

A client requests access to a computing system over a time period. At the time of the request, the storage associated with the request is below a weight-transition threshold of 10 GB. In response to the request, a core group is generated that includes a maximum log count of 400,000,000. The core group is assigned to a particular node set.

Because the storage associated with the request is below the weight-transition threshold, the core group is assigned a low weight (of 0.2). Additionally, the client qualifies for a free account due to the storage being below the weight-transition threshold. The client continues to upload (and occasionally delete) data.

It is subsequently detected that the total size of the data being hosted at the computing system from the client substantially exceeds the weight-transition threshold, as recent uploads result in the total data size topping thousands of gigabytes (whereas the weight-transition threshold is 10 GB).

It is determined that the total data size (of thousands of gigabytes) exceeds a maximum capacity for the core group. Thus, one or more new core groups are created for the client. Each core group is assigned to a respective node set, and the core groups associated with the client are distributed across multiple different node sets. Given that the data size for the client exceeds the weight-transition threshold, each of the core groups associated with the client is assigned a high weight (of 1.0).

The client then purges most of the data, such that the total data size associated with the client drops below the weight-transition threshold. The weight of each core group associated with the client is then set to a low weight (of 0.2).

At the time that each core group associated with the client was assigned to a node set, the node set was configured to accept new core groups until the node set reached 10 GB. However, as a result of the total data size associated with the client changing dynamically, the size of at least one node set to which a core group associated with the client was assigned exceeded the 10 GB.

Example 6: Low-Usage Client with Limited Core-Group Resources

Each of 40 clients requests access to a computing system over a short period of time. At the time that each request is received, the storage associated with the request is below a weight-transition threshold of 10 GB. In response to each request, a core group is generated that includes a maximum log count of 400,000,000.

Because the storage associated with each request is below the weight-transition threshold, each group is assigned a low weight (of 0.2). Additionally, each of the multiple clients qualifies for a free account due to the storage being below the weight-transition threshold.

Each of the core groups is assigned to a same particular node set that has a node-set limit of 50. The used weight of the node set is thus 8 (40 requests*0.2 weight/request), and the maximum weight of the node set is 10.

One of the 40 clients continues to load data to the computing system and soon has more than 400,000,000 logs stored on the computing system. In response, the core group associated with the client is then assigned a weight of 1.0 and closed. A new core group is generated for the client on a different node set. A weight for the new core group is set to 1.0, given that the total storage associated with the client exceeds 10 GB (assuming that the average log is 500 bytes).

The client then purges most of the data, such that the total data size associated with the client drops below the weight-transition threshold. The weight of each core group associated with the client is then set to a low weight (of 0.2).

Example 7: Many Low-Usage Clients with Very Small Log Entries

Each of 50 clients requests access to a computing system over a short period of time. At the time that each request is received, the storage associated with the request is below a weight-transition threshold of 10 GB. In response to each request, a core group is generated that includes a maximum log count of 400,000,000.

Because the storage associated with each request is below the weight-transition threshold, each group is assigned a low weight (of 0.2). Additionally, each of the multiple clients qualifies for a free account due to the storage being below the weight-transition threshold.

Each of the core groups is assigned to a same particular node set that has a node-set limit of 50. The used weight of the node set is thus 10 (50 requests*0.2 weight/request), and the maximum weight of the node set is 10.

However, the logs that the 50 clients upload to the system are very small, with most being 50 bytes (as compared to a typical size of 500 bytes). Thus, a 10 GB core group can support 200,000,000 of these very logs.

For one of the 50 clients, storage usage remains less than 10 GB. In response, the core group associated with the client is not closed and maintains the low weight.

For another of the 50 clients, more than 400,000,000 logs are concurrently stored on the computing system. A total storage size for this other client is then 20 GB. In response to detecting that the maximum log count has been exceed, the core group associated with the client is closed, and a new core group is generated on another node set. In response to detecting that the total storage size exceeded the weight-transition threshold, each of the closed core group and the new core group is assigned a weight of 1.0. In this example, the total storage capacity of the node may be less than the combined total storage of the 50 clients. The other client, having exceeded the weight-transition threshold (and in so doing becoming a paid customer), may then have priority to the node. One or more of the remaining 49 clients may be transitioned to another node in order to free up capacity at the node for the other client.

Figure 2:
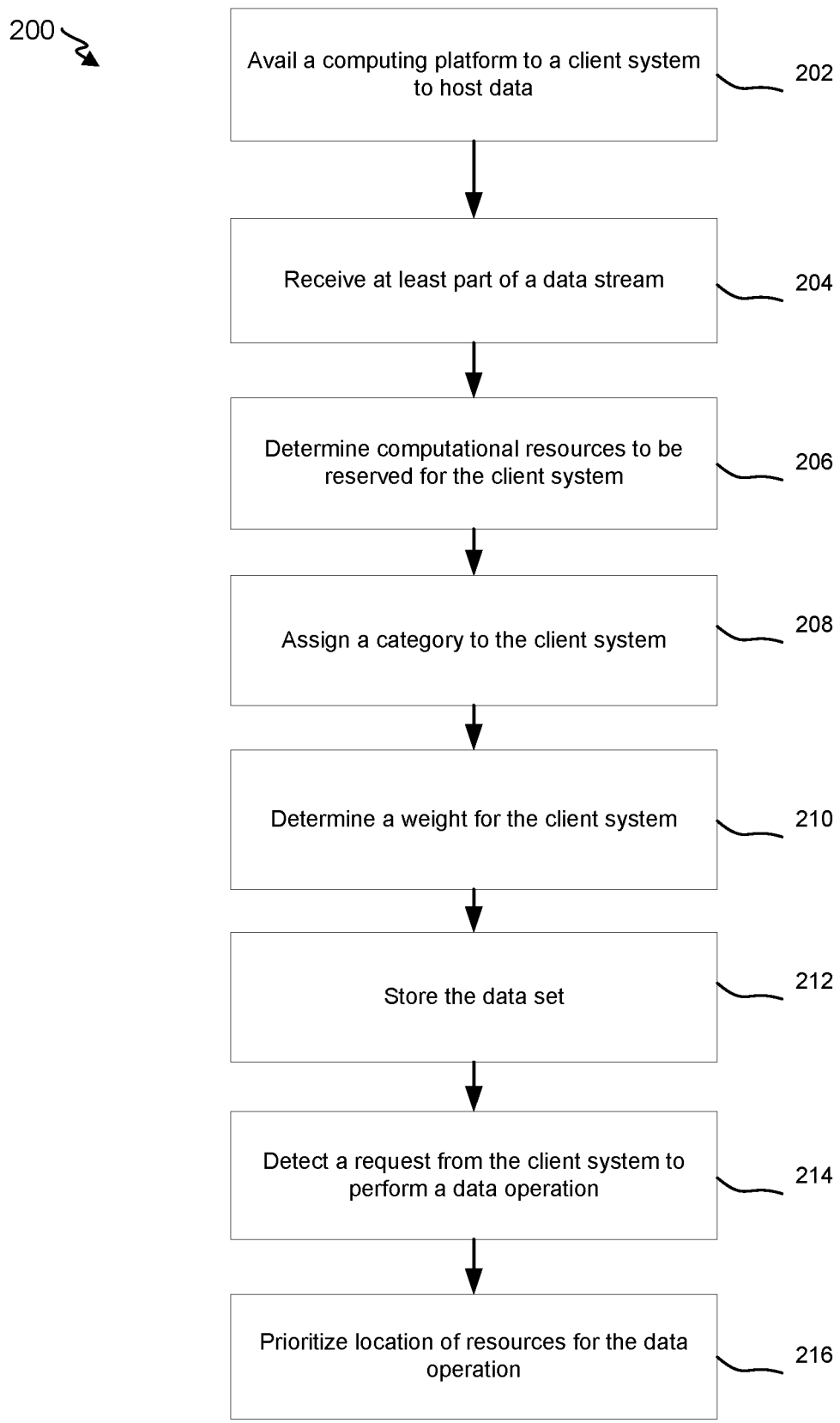
FIG. 2 depicts a flowchart of a method for allocating resources to a client system, according to certain embodiments.

FIG. 2 depicts a flowchart of a method 200 for allocating resources to a client system, according to certain embodiments. At step 202, a computing platform may be availed to a client system. The computing platform may host data from the client system. The computing platform may also perform data operations on the hosted data.

At step 204, the computing platform may receive at least part of a streaming data set from the client device. The streaming data set may include log files or other such data sets. At step 206, the computing platform may determine computational resources to be reserved for the client system. The computational resources may be determined at least in part by a size of the data set. The computational resources may also be determined by a size of any other data received from the client system and hosted on the computing platform.

At step 208, a category may be assigned to the client system. In some embodiments, the category based at least in part on a rule set (e.g., whether the client is a paying customer or not). In other embodiments, the category may include a business type, data type, or other such category. At step 210, the category may be used at least in part to determine an assigned weight for the client system. The weight my indicate a degree to which resources of one or more types may be preferentially allocated to process requests associated with the client system, relative to requests associated with other weights. The weight may also be used to determine a threshold to which the client system is allowed to grow.

In some embodiments, determining the weight may include determining whether the data size is below a predefined threshold. The predetermined threshold may be different for different client systems. For example, one client system may have a threshold of 10 GB whereas another client system may have a threshold of 100 GB. If the size of the data set is below the threshold, the weight may be set to a low value. If the size of the data set is above the threshold, the weight may be set to a high value. The allocation of resources may then be biased towards operations associated core groups associated with a higher value.

At step 212, the data set may be stored at a data storage of the computing platform. The data storage may include devices such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

At step 214, the computing platform may detect a request from the client system to perform a data operation using the data set. At step 216, the computing platform may prioritize one or more resources for the data operation. The prioritization may be based on the weight assigned to the client system. The prioritization may influence how quickly the data operation is performed, relative to the other data operations associated with other client systems having different weights.

In some embodiments, the prioritization of allocation of the one or more resources includes balancing weights across a set of node sets in the computing platform using a technique to provide for potential growth of each core initially assigned to each node to grow in size. The technique may include shifting core groups from a first node to a second node, depending upon the capacity of the node and the weights of client systems assigned to the first and second nodes. The potential growth may accommodate a potential transition from a predicted storage extreme associated with a low weight to a higher predicted storage extreme associated with a high weight.

In some embodiments, the size of the data set received by the computing platform from the client system may be dynamically-monitored. Updates to the weights associated with the client system may then be dynamically-determined based on the size of the data set. For example, if the size of the data set increases, the weight associated with the client system may be increased. Similarly, the allocation of one or more resources may then be dynamically-adapted based on the weight.

In some embodiments, a core group may be identified to receive the data set. To identify the core group, one or more existing core groups may be identified, where the one or more existing core groups are associated with the client system. The one or more existing core groups may also be determined to be at a predefined capacity. A new core group may then be generated for the client system, where the identified core group is the new core group. An updated data size may then be determined, where an existing data size associated with the client system is combined with the data set. A new weight may then be determined based upon the updated data size, and a new weight assigned to the new core group and the existing core groups. One or more resources may then be prioritized for a new data operation associated with the client system based on the new weight.

In some embodiments, a core group may be identified to receive the data set, where the core group is hosted at a node set of the computing platform. The quantity of total core groups hosted at the node set may be based on a maximum potential weight. To identify the core group, one or more existing core groups may be identified, where the one or more existing core groups are associated with the client system. The one or more existing core groups may also be determined to be at a predefined capacity. A new core group may then be generated for the client system, where the identified core group is the new core group. An updated data size may then be determined, where an existing data size associated with the client system is combined with the data set. A new weight may then be determined based upon the updated data size, and a new weight assigned to the new core group and the existing core groups. One or more resources may then be prioritized for a new data operation associated with the client system based on the new weight.

Figure 3:
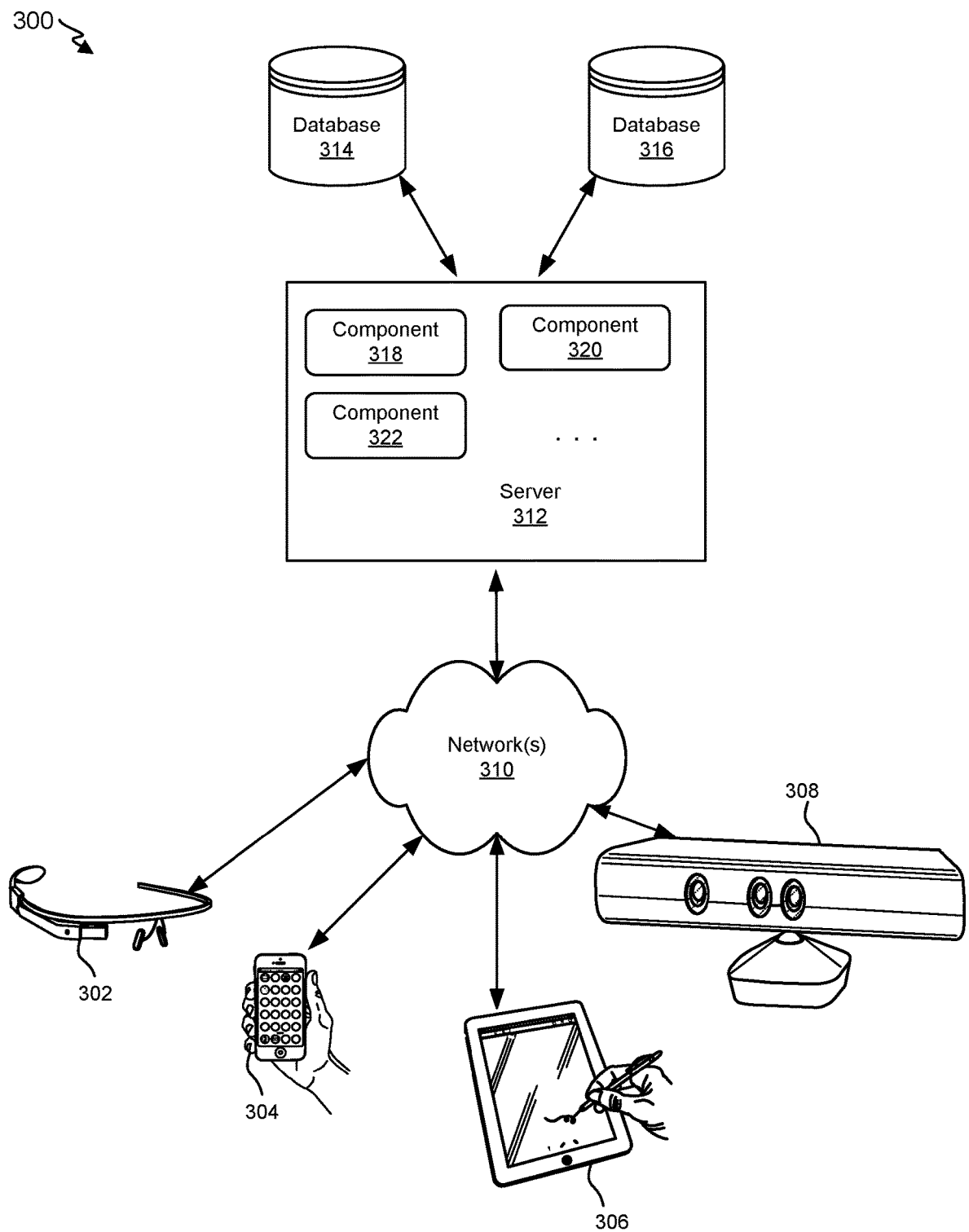
FIG. 3 depicts a simplified diagram of a distributed system for implementing one of the embodiments.

FIG. 3 depicts a simplified diagram of a distributed system 300 for implementing one of the embodiments. In the illustrated embodiment, distributed system 300 includes one or more client computing devices 302, 304, 306, and 308, which are configured to execute and operate a client application such as a web browser, proprietary client (e.g., Oracle Forms), or the like over one or more network(s) 310. Server 312 may be communicatively coupled with remote client computing devices 302, 304, 306, and 308 via network 310.

In various embodiments, server 312 may be adapted to run one or more services or software applications provided by one or more of the components of the system. In some embodiments, these services may be offered as web-based or cloud services or under a Software as a Service (SaaS) model to the users of client computing devices 302, 304, 306, and/or 308. Users operating client computing devices 302, 304, 306, and/or 308 may in turn utilize one or more client applications to interact with server 312 to utilize the services provided by these components.

In the configuration depicted in the figure, the software components 318, 320 and 322 of system 300 are shown as being implemented on server 312. In other embodiments, one or more of the components of system 300 and/or the services provided by these components may also be implemented by one or more of the client computing devices 302, 304, 306, and/or 308. Users operating the client computing devices may then utilize one or more client applications to use the services provided by these components. These components may be implemented in hardware, firmware, software, or combinations thereof. It should be appreciated that various different system configurations are possible, which may be different from distributed system 300. The embodiment shown in the figure is thus one example of a distributed system for implementing an embodiment system and is not intended to be limiting.

Client computing devices 302, 304, 306, and/or 308 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 302, 304, 306, and 308 may be any other electronic device, such as a thin-client computer, an Internet-enabled gaming system (e.g., a Microsoft Xbox gaming console with or without a Kinect® gesture input device), and/or a personal messaging device, capable of communicating over network(s) 310.

Although exemplary distributed system 300 is shown with four client computing devices, any number of client computing devices may be supported. Other devices, such as devices with sensors, etc., may interact with server 312.

Network(s) 310 in distributed system 300 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 310 can be a local area network (LAN), such as one based on Ethernet, Token-Ring and/or the like. Network(s) 310 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 312 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 312 may be adapted to run one or more services or software applications described in the foregoing disclosure. For example, server 312 may correspond to a server for performing processing described above according to an embodiment of the present disclosure.

Server 312 may run an operating system including any of those discussed above, as well as any commercially available server operating system. Server 312 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 312 may include one or more applications to analyze and consolidate data feeds and/or event updates received from users of client computing devices 302, 304, 306, and 308. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 312 may also include one or more applications to display the data feeds and/or real-time events via one or more display devices of client computing devices 302, 304, 306, and 308.

Distributed system 300 may also include one or more databases 314 and 316. Databases 314 and 316 may reside in a variety of locations. By way of example, one or more of databases 314 and 316 may reside on a non-transitory storage medium local to (and/or resident in) server 312. Alternatively, databases 314 and 316 may be remote from server 312 and in communication with server 312 via a network-based or dedicated connection. In one set of embodiments, databases 314 and 316 may reside in a storage-area network (SAN). Similarly, any necessary files for performing the functions attributed to server 312 may be stored locally on server 312 and/or remotely, as appropriate. In one set of embodiments, databases 314 and 316 may include relational databases, such as databases provided by Oracle, that are adapted to store, update, and retrieve data in response to SQL-formatted commands.

Figure 4:
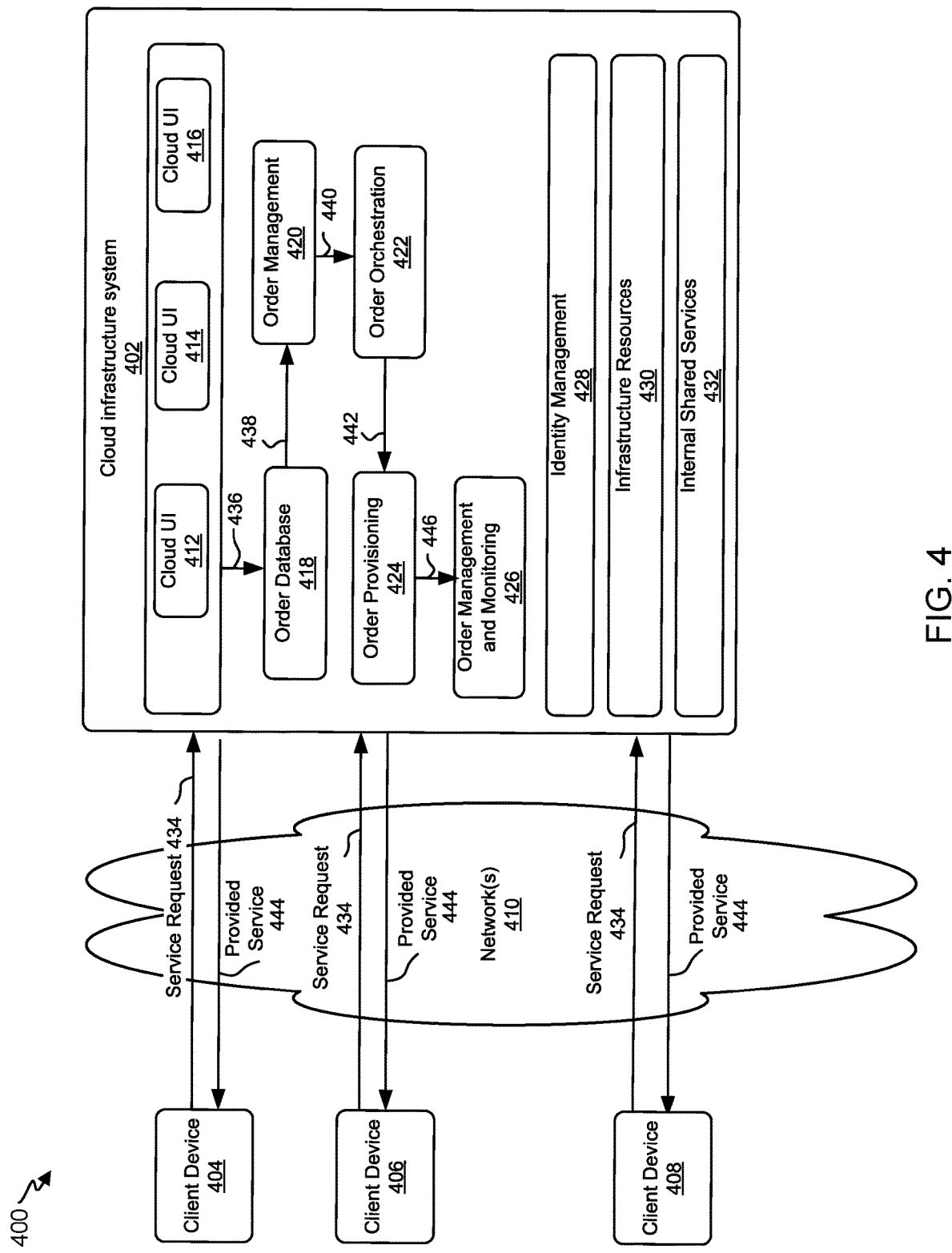
FIG. 4 is a simplified block diagram of one or more components of a system environment by which services provided by one or more components of an embodiment system may be offered as cloud services, in accordance with an embodiment of the present disclosure.

FIG. 4 is a simplified block diagram of one or more components of a system environment 400 by which services provided by one or more components of an embodiment system may be offered as cloud services, in accordance with an embodiment of the present disclosure. In the illustrated embodiment, system environment 400 includes one or more client computing devices 404, 406, and 408 that may be used by users to interact with a cloud infrastructure system 402 that provides cloud services. The client computing devices may be configured to operate a client application such as a web browser, a proprietary client application (e.g., Oracle Forms), or some other application, which may be used by a user of the client computing device to interact with cloud infrastructure system 402 to use services provided by cloud infrastructure system 402.

It should be appreciated that cloud infrastructure system 402 depicted in the figure may have other components than those depicted. Further, the embodiment shown in the figure is only one example of a cloud infrastructure system that may incorporate an embodiment of the invention. In some other embodiments, cloud infrastructure system 402 may have more or fewer components than shown in the figure, may combine two or more components, or may have a different configuration or arrangement of components.

Client computing devices 404, 406, and 408 may be devices similar to those described above for 302, 304, 306, and 308.

Although exemplary system environment 400 is shown with three client computing devices, any number of client computing devices may be supported. Other devices such as devices with sensors, etc. may interact with cloud infrastructure system 402.

Network(s) 410 may facilitate communications and exchange of data between clients 404, 406, and 408 and cloud infrastructure system 402. Each network may be any type of network familiar to those skilled in the art that can support data communications using any of a variety of commercially-available protocols, including those described above for network(s) 410.

Cloud infrastructure system 402 may comprise one or more computers and/or servers that may include those described above for server 412.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 402 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 402 may be adapted to automatically provision, manage and track a customer's subscription to services offered by cloud infrastructure system 402. Cloud infrastructure system 402 may provide the cloud services via different deployment models. For example, services may be provided under a public cloud model in which cloud infrastructure system 402 is owned by an organization selling cloud services (e.g., owned by Oracle) and the services are made available to the general public or different industry enterprises. As another example, services may be provided under a private cloud model in which cloud infrastructure system 402 is operated solely for a single organization and may provide services for one or more entities within the organization. The cloud services may also be provided under a community cloud model in which cloud infrastructure system 402 and the services provided by cloud infrastructure system 402 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 402. Cloud infrastructure system 402 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 402 may also include infrastructure resources 430 for providing the resources used to provide various services to customers of the cloud infrastructure system. In one embodiment, infrastructure resources 430 may include pre-integrated and optimized combinations of hardware, such as servers, storage, and networking resources to execute the services provided by the PaaS platform and the SaaS platform.

In some embodiments, resources in cloud infrastructure system 402 may be shared by multiple users and dynamically re-allocated per demand. Additionally, resources may be allocated to users in different time zones. For example, cloud infrastructure system 430 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 432 may be provided that are shared by different components or modules of cloud infrastructure system 402 and by the services provided by cloud infrastructure system 402. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 402 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 402, and the like.

In one embodiment, as depicted in the figure, cloud management functionality may be provided by one or more modules, such as an order management module 420, an order orchestration module 422, an order provisioning module 424, an order management and monitoring module 426, and an identity management module 428. These modules may include or be provided using one or more computers and/or servers, which may be general purpose computers, specialized server computers, server farms, server clusters, or any other appropriate arrangement and/or combination.

In exemplary operation 434, a customer using a client device, such as client device 404, 406 or 408, may interact with cloud infrastructure system 402 by requesting one or more services provided by cloud infrastructure system 402 and placing an order for a subscription for one or more services offered by cloud infrastructure system 402. In certain embodiments, the customer may access a cloud User Interface (UI), cloud UI 412, cloud UI 414 and/or cloud UI 416 and place a subscription order via these UIs. The order information received by cloud infrastructure system 402 in response to the customer placing an order may include information identifying the customer and one or more services offered by the cloud infrastructure system 402 that the customer intends to subscribe to.

After an order has been placed by the customer, the order information is received via the cloud UIs, 412, 414 and/or 416.

At operation 436, the order is stored in order database 418. Order database 418 can be one of several databases operated by cloud infrastructure system 418 and operated in conjunction with other system elements.

At operation 438, the order information is forwarded to an order management module 420. In some instances, order management module 420 may be configured to perform billing and accounting functions related to the order, such as verifying the order, and upon verification, booking the order.

At operation 440, information regarding the order is communicated to an order orchestration module 422. Order orchestration module 422 may utilize the order information to orchestrate the provisioning of services and resources for the order placed by the customer. In some instances, order orchestration module 422 may orchestrate the provisioning of resources to support the subscribed services using the services of order provisioning module 424.

In certain embodiments, order orchestration module 422 enables the management of business processes associated with each order and applies business logic to determine whether an order should proceed to provisioning. At operation 442, upon receiving an order for a new subscription, order orchestration module 422 sends a request to order provisioning module 424 to allocate resources and configure those resources needed to fulfill the subscription order. Order provisioning module 424 enables the allocation of resources for the services ordered by the customer. Order provisioning module 424 provides a level of abstraction between the cloud services provided by cloud infrastructure system 400 and the physical implementation layer that is used to provision the resources for providing the requested services. Order orchestration module 422 may thus be isolated from implementation details, such as whether or not services and resources are actually provisioned on the fly or pre-provisioned and only allocated/assigned upon request.

At operation 444, once the services and resources are provisioned, a notification of the provided service may be sent to customers on client devices 404, 406 and/or 408 by order provisioning module 424 of cloud infrastructure system 402.

At operation 446, the customer's subscription order may be managed and tracked by an order management and monitoring module 426. In some instances, order management and monitoring module 426 may be configured to collect usage statistics for the services in the subscription order, such as the amount of storage used, the amount data transferred, the number of users, and the amount of system up time and system down time.

In certain embodiments, cloud infrastructure system 400 may include an identity management module 428. Identity management module 428 may be configured to provide identity services, such as access management and authorization services in cloud infrastructure system 400. In some embodiments, identity management module 428 may control information about customers who wish to utilize the services provided by cloud infrastructure system 402. Such information can include information that authenticates the identities of such customers and information that describes which actions those customers are authorized to perform relative to various system resources (e.g., files, directories, applications, communication ports, memory segments, etc.) Identity management module 428 may also include the management of descriptive information about each customer and about how and by whom that descriptive information can be accessed and modified.

Figure 5:
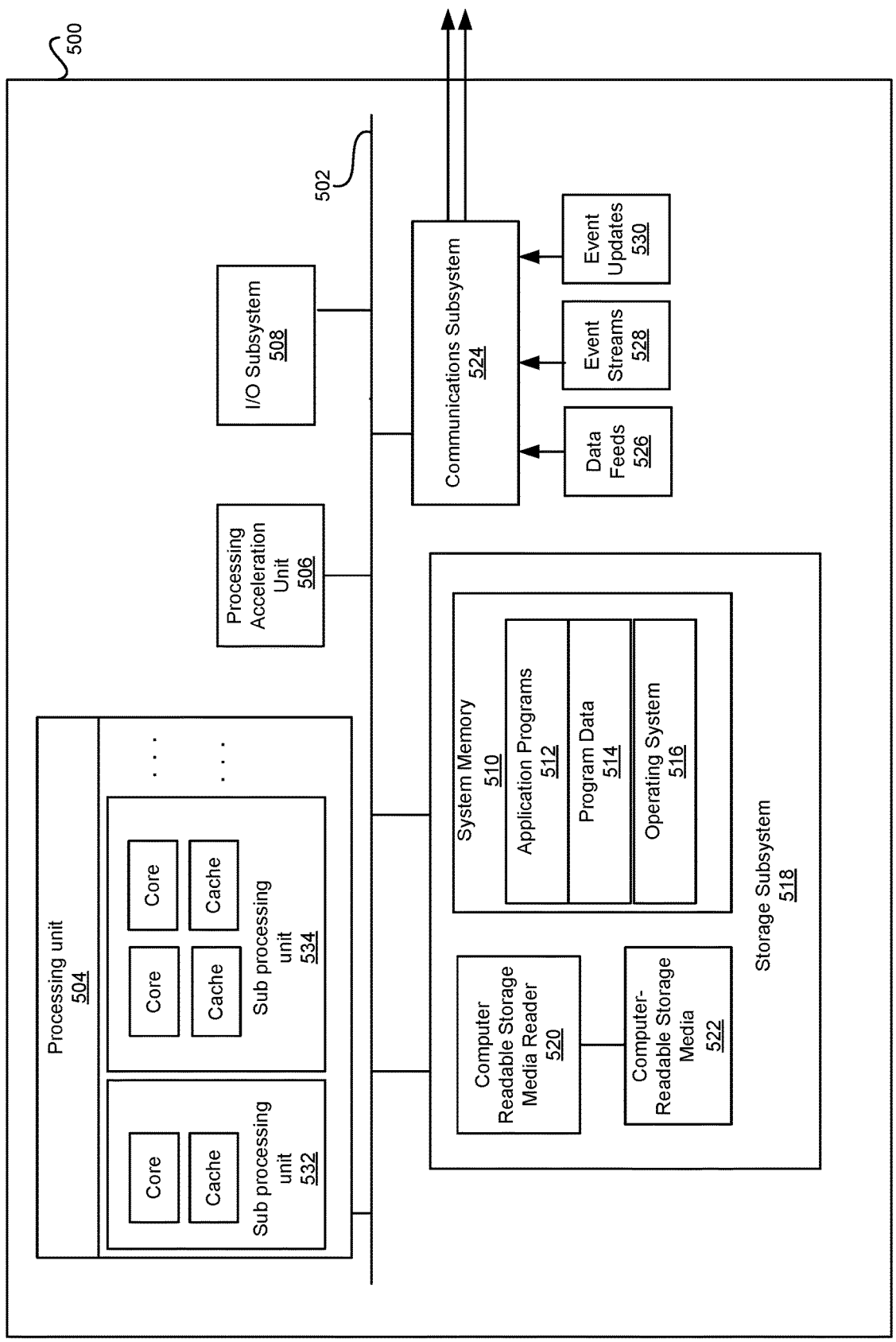
FIG. 5 illustrates an exemplary computer system, in which various embodiments of the present invention may be implemented.

FIG. 5 illustrates an exemplary computer system 500, in which various embodiments of the present invention may be implemented. The system 500 may be used to implement any of the computer systems described above. As shown in the figure, computer system 500 includes a processing unit 504 that communicates with a number of peripheral subsystems via a bus subsystem 502. These peripheral subsystems may include a processing acceleration unit 506, an I/O subsystem 508, a storage subsystem 518 and a communications subsystem 524. Storage subsystem 518 includes tangible computer-readable storage media 522 and a system memory 510.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which can be implemented as one or more integrated circuits (e.g., a conventional microprocessor or microcontroller), controls the operation of computer system 500. One or more processors may be included in processing unit 504. These processors may include single core or multicore processors. In certain embodiments, processing unit 504 may be implemented as one or more independent processing units 532 and/or 534 with single or multicore processors included in each processing unit. In other embodiments, processing unit 504 may also be implemented as a quad-core processing unit formed by integrating two dual-core processors into a single chip.

In various embodiments, processing unit 504 can execute a variety of programs in response to program code and can maintain multiple concurrently executing programs or processes. At any given time, some or all of the program code to be executed can be resident in processor(s) 1204 and/or in storage subsystem 518. Through suitable programming, processor(s) 504 can provide various functionalities described above. Computer system 500 may additionally include a processing acceleration unit 506, which can include a digital signal processor (DSP), a special-purpose processor, and/or the like.

I/O subsystem 508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 500 may comprise a storage subsystem 518 that comprises software elements, shown as being currently located within a system memory 510. System memory 510 may store program instructions that are loadable and executable on processing unit 504, as well as data generated during the execution of these programs.

Depending on the configuration and type of computer system 500, system memory 510 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 504. In some implementations, system memory 510 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the ROM. By way of example, and not limitation, system memory 510 also illustrates application programs 512, which may include client applications, Web browsers, mid-tier applications, relational database management systems (RDBMS), etc., program data 514, and an operating system 516. By way of example, operating system 516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 518 may also provide a tangible computer-readable storage medium for storing the basic programming and data constructs that provide the functionality of some embodiments. Software (programs, code modules, instructions) that when executed by a processor provide the functionality described above may be stored in storage subsystem 518. These software modules or instructions may be executed by processing unit 504. Storage subsystem 518 may also provide a repository for storing data used in accordance with the present invention.

Storage subsystem 500 may also include a computer-readable storage media reader 1220 that can further be connected to computer-readable storage media 522. Together and, optionally, in combination with system memory 510, computer-readable storage media 522 may comprehensively represent remote, local, fixed, and/or removable storage devices plus storage media for temporarily and/or more permanently containing, storing, transmitting, and retrieving computer-readable information.

Computer-readable storage media 522 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 500.

By way of example, computer-readable storage media 522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 522 may include, but is not limited to, Zip® drives, flash memory cards, universal serial bus (USB) flash drives, secure digital (SD) cards, DVD disks, digital video tape, and the like. Computer-readable storage media 522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 524 provides an interface to other computer systems and networks. Communications subsystem 524 serves as an interface for receiving data from and transmitting data to other systems from computer system 500. For example, communications subsystem 524 may enable computer system 500 to connect to one or more devices via the Internet. In some embodiments communications subsystem 524 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 524 can provide wired network connectivity (e.g., Ethernet) in addition to or instead of a wireless interface.

In some embodiments, communications subsystem 524 may also receive input communication in the form of structured and/or unstructured data feeds 526, event streams 528, event updates 530, and the like on behalf of one or more users who may use computer system 500.

By way of example, communications subsystem 524 may be configured to receive data feeds 526 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 524 may also be configured to receive data in the form of continuous data streams, which may include event streams 528 of real-time events and/or event updates 530, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 524 may also be configured to output the structured and/or unstructured data feeds 526, event streams 528, event updates 530, and the like to one or more databases that may be in communication with one or more streaming data source computers coupled to computer system 500.

Computer system 500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification, and variation of the concepts herein disclosed may be resorted to by those skilled in the art, and that such modifications and variations are considered to be within the scope of this invention as defined by the appended claims.

The description provides preferred exemplary embodiments only, and is not intended to limit the scope, applicability or configuration of the disclosure. Rather, the description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the following description to provide a thorough understanding of the embodiments. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

What is claimed is:

1. A computer-implemented method comprising:
availing a plurality of nodes associated with a computing platform to a client system to host data and perform data processing, wherein:
   each of the plurality of nodes includes of a plurality of core groups,
   each of the plurality of core groups has a predetermined storage, and
   each of the plurality of core groups are assigned a core group weight based an amount of storage being used by the client system;
receiving at least part of a streaming data set from the client system to the computing platform;
determining computational resources to be reserved for the client system based at least in part on a size of the data set and a size of any other data received from the client system and being hosted on the computing platform, wherein:
   the computational resources include a first set of core groups of the plurality of core groups, and
   the first set of core groups are assigned to a set of nodes of the plurality of nodes based on the core group weight corresponding to the first set of core groups;
determining a weight for the client system based on the size of the data set, wherein the weight indicates a degree to which resources of one or more types are to be preferentially allocated to process requests associated with the client system relative to processing of requests associated with other weights;
detecting a change in the size of the data set received from the client system;
dynamically updating, based on the change in the size of the data set, the weight for the client system and the core group weight associated with the first set of core groups;
storing the data set at a data storage of the computing platform;
detecting a request from the client system that a data operation be performed using the data set; and
prioritizing allocation of a second set of core groups of the plurality of core groups for the data operation based on the updated weight for the client system and core group weight associated with the first set of core groups, wherein the prioritization influences how quickly the data operation is to be performed relative to performance of other data operations associated with client systems having different weights relative to the weight for the client system.

2. The computer-implemented method of claim 1, wherein the prioritization of allocation of the second set of core groups resources includes balancing weights across the plurality of nodes in the computing platform using a technique to provide for potential growth of each of the plurality of core groups initially assigned to each node of the plurality of nodes to grow in size.

3. The computer-implemented method of claim 2, wherein the potential growth accommodates a potential transition from a predicted storage extreme associated with a low weight to a higher predicted storage extreme associated with a high weight.

4. The computer-implemented method of claim 1, wherein determining the weight includes:
  determining whether the size of the data set is below a predefined weight-transition threshold;
  setting the weight to a low value when the size of the data set is below the predefined weight-transition threshold; and
  setting the weight to a high value when the size of the data set is above the predefined weight-transition threshold, wherein allocation of the computational resources are biased towards operations associated with core groups associated with higher weights.

5. The computer-implemented method of claim 1, wherein identifying the first set of core groups to receive the data includes:
  identifying one or more existing core groups associated with the client system;
  determining that each of the one or more existing core groups is at a predefined capacity; and
  generating a new core group for the client system, wherein the new core group includes the first set of core groups.

6. The computer-implemented method of claim 1, wherein a quantity of total core groups hosted at the set of nodes is determined based on a maximum potential weight.

7. A system comprising:
  one or more data processors; and
  a non-transitory computer readable storage medium containing instructions which, when executed on the one or more data processors, cause the one or more data processors to:
    avail a plurality of nodes associated with a computing platform to a client system to host data and perform data processing, wherein:
      each of the plurality of nodes includes of a plurality of core groups,
      each of the plurality of core groups has a predetermined storage, and
      each of the plurality of core groups are assigned a core group weight based an amount of storage being used by the client system;
    receive at least part of a streaming data set from the client system to the computing platform;
    determine computational resources to be reserved for the client system based at least in part on a size of the data set and a size of any other data received from the client system and being hosted on the computing platform, wherein:
      the computational resources includes a first set of core groups of the plurality of core groups, and
      the first set of core groups are assigned to a set of nodes of the plurality of nodes based on the core group weight corresponding to the first set of core groups;
    determine a weight for the client system based on the size of the data set, wherein the weight indicates a degree to which resources of one or more types are to be preferentially allocated to process requests associated with the client system relative to processing of requests associated with other weights;
    detect a change in the size of the data set received from the client system;
    dynamically update, based on the change in the size of the data set, the weight for the client system and the core group weight associated with the first set of core groups;
    store the data set at a data storage of the computing platform;
    detect a request from the client system that a data operation be performed using the data set; and
    prioritize allocation of a second set of core groups of the plurality of core groups for the data operation based on the updated weight for the client system and core group weight associated with the first set of core groups, wherein the prioritization influences how quickly the data operation is to be performed relative to performance of other data operations associated with client systems having different weights relative to the weight for the client system.

8. The system of claim 7 wherein the instructions further cause the data processors to:
  determine whether the size of the data set is below a predefined weight-transition threshold;
  assign the weight to a low value when the size of the data set is below the predefined weight-transition threshold; and
  assign the weight to a high value when the size of the data set is above the predefined weight-transition threshold, wherein allocation of the computational resources are biased towards operations associated with core groups associated with higher weights.

9. The system of claim 7, wherein a quantity of total core groups hosted at the set of nodes is determined based on a maximum potential weight.

10. A computer-program product tangibly embodied in a non-transitory machine-readable storage medium, including instructions configured to cause one or more data processors to:
  avail a plurality of nodes associated with a computing platform to a client system to host data and perform data processing, wherein:
    each of the plurality of nodes includes of a plurality of core groups,
    each of the plurality of core groups has a predetermined storage, and
    each of the plurality of core groups are assigned a core group weight based an amount of storage being used by the client system;
  receive at least part of a streaming data set from the client system to the computing platform;
  determine computational resources to be reserved for the client system based at least in part on a size of the data set and a size of any other data received from the client system and being hosted on the computing platform, wherein:
    the computational resources includes a first set of core groups of the plurality of core groups, and
    the first set of core groups are assigned to a set of nodes of the plurality of nodes based on the core group weight corresponding to the first set of core groups;
  determine a weight for the client system based on the size of the data set, wherein the weight indicates a degree to which resources of one or more types are to be preferentially allocated to process requests associated with the client system relative to processing of requests associated with other weights;
  detect a change in the size of the data set received from the client system;

dynamically update, based on the change in size of the data set, the weight for the client system and the core group weight associated with the first set of core groups;

store the data set at a data storage of the computing platform;

detect a request from the client system that a data operation be performed using the data set; and prioritize allocation of a second set of core groups of the plurality of core groups for the data operation based on the updated weight for the client system and core group weight associated with the first set of core groups, wherein the prioritization influences how quickly the data operation is to be performed relative to performance of other data operations associated with client systems having different weights relative to the weight for the client system.

11. The computer-program product of claim 10, wherein the instructions further cause the one or more data processors to:

determine whether the size of the data set is below a predefined threshold;

assign the weight to a low value when the data size is below the predefined threshold; and assign the weight to a high value when the data size is above the predefined threshold, wherein allocation of the computational resources are biased towards operations associated with core groups associated with higher weights.

12. The computer-program product of claim 10, wherein a quantity of total core groups hosted at the set of nodes is determined based on a maximum potential weight.

13. The computer-program product of claim 10, wherein the instructions further cause the processors to identify the first set of core groups to receive the data includes by:

identifying one or more existing core groups associated with the client system;

determining that each of the one or more existing core groups is at a predefined capacity; and generating a new core group for the client system, wherein the new core group includes the first set of core groups.

14. The computer-program product of claim 10, prioritization of allocation of the second set of core groups resources includes balancing weights across the plurality of nodes in the computing platform using a technique to provide for potential growth of each of the plurality of core groups initially assigned to each node of the plurality of nodes to grow in size.

* * * * *